(12) United States Patent
Lincoln et al.

(10) Patent No.: US 7,930,816 B2
(45) Date of Patent: Apr. 26, 2011

(54) METHODS FOR MANUFACTURING FLOW METER INSERT (75) Inventors: David Lincoln, Gloucestershire (GB); Michael Armitage, Gloucestershire (GB); David Burton, Gloucestershire (GB)

(73) Assignee: ABB Limited (GB)

( * ) Notice: Subject to any disclaimer, the term of this patent is extended or adjusted under 35 U.S.C. 154(b) by 439 days.

(21) Appl. No.: 11/061,376

(22) Filed: Feb. 18, 2005

(65) Prior Publication Data

US 2005/0210997 A1 Sep. 29, 2005

(30) Foreign Application Priority Data

Feb. 20, 2004 (GB) .................................. 0403831.1

(51) Int. Cl.
*G01F 1/58* (2006.01)
(52) U.S. Cl. ..... 29/602.1; 29/592.1; 73/201; 73/861.12; 73/861.13
(58) Field of Classification Search ................ 29/602.1, 29/604, 607, 609; 73/861.11, 201, 861.08, 73/861.12, 861.13
See application file for complete search history.

(56) References Cited

U.S. PATENT DOCUMENTS

| | | | | |
|---|---|---|---|---|
| 3,608,375 A | * | 9/1971 | Cushing | 73/861.12 |
| 3,695,104 A | * | 10/1972 | Mannherz et al. | 73/861.12 |
| 3,824,856 A | * | 7/1974 | Yard | 73/861.12 |
| 5,280,727 A | * | 1/1994 | Hafner et al. | 73/861.12 |
| 6,269,530 B1 | * | 8/2001 | Armitage et al. | 29/602.1 |
| 6,658,720 B1 | | 12/2003 | Frey et al. | |
| 6,877,386 B2 | * | 4/2005 | Needham et al. | 73/861.11 |

FOREIGN PATENT DOCUMENTS

| | | |
|---|---|---|
| DE | 3340103 A1 | 5/1985 |
| DE | 19708857 | 7/1998 |
| EP | 0581017 | 2/1994 |
| EP | 0895066 | 7/1998 |
| GB | 945356 A | 12/1960 |
| GB | 2289514 A | 11/1995 |
| GB | 2314902 A | 1/1998 |
| GB | 2328021 A | 2/1999 |
| GB | 2371368 A | 7/2002 |
| GB | 2385667 A | 6/2003 |
| GB | 2403016 A | 12/2004 |
| JP | 61022216 A | 1/1986 |
| JP | 10197301 | 7/1998 |
| WO | WO 9309403 A1 * | 5/1993 |

OTHER PUBLICATIONS

European Search Report from EP 1 574 828 A3 dated Dec. 7, 2007.

* cited by examiner

*Primary Examiner* — A. Dexter Tugbang
*Assistant Examiner* — Livius R Cazan
(74) *Attorney, Agent, or Firm* — Knobbe Martens Olson & Bear, LLP (57) ABSTRACT

A method of manufacturing an electromagnetic flow meter assembly is disclosed. The method comprises forming an insert from a deformable material, forming at least one reinforcing component; arranging the reinforcing component around a portion of the insert, and bonding the reinforcing component to the insert to reinforce the insert against deformation under the application of pressure. An electromagnetic flow meter assembly is also disclosed and comprises an insert for insertion into a flow conduit, wherein at least a portion of the insert is formed of a deformable non-ferromagnetic material, wherein the insert comprises an inlet section, a measuring section, and an outlet section. The assembly further comprises at least one reinforcing component surrounding the measuring section of the insert to reinforce the insert against deformation under the application of pressure.

30 Claims, 10 Drawing Sheets

METHODS FOR MANUFACTURING FLOW METER INSERT

BACKGROUND OF THE INVENTION

1. Field of the Invention

The present invention relates to the field of electromagnetic flow meters, in particular to inserts for flow meters and to methods of manufacturing such inserts and assembling the flow meters.

2. Description of the Related Technology

An electromagnetic flow meter using a pre-formed insert is discussed in the applicant's United Kingdom Patent No. 2328021, together with a description of such inserts and methods for their manufacture. In particular, it is noted that, in a conventional method in which no insert is used, difficulty and expense may be encountered at the point of assembling the meter components into a portion of a pipeline, since a wide variety of pipeline configurations exist and it is generally necessary to construct flow meters bespoke to fit the various structures.

GB-A-2328021 discloses a sensor assembly, or flow meter insert, which may be pre-formed and inserted into a spool piece. The spool piece may then be arranged in series in a pipeline to allow the flow meter to measure the flow of fluid in the pipeline. Sections of the insert may be manufactured from a deformable material, for example a resiliently deformable material such as rubber, and the shape and structure of the insert may be supported by reinforcing components moulded into the rubber.

SUMMARY OF CERTAIN INVENTIVE EMBODIMENTS

According to a first aspect, there is provided a method of manufacturing an electromagnetic flow meter assembly comprising forming an insert from a deformable material; forming at least one reinforcing component; arranging the reinforcing component around a portion of the insert; and bonding the reinforcing component to the insert to reinforce the insert against deformation under the application of pressure.

As a further development of GB-A-2328021, it has been found to be surprisingly advantageous to form the inlet section and the reinforcing component separately and to couple the components together during the manufacture of the flow meter. Although this method increases the number of steps in the production method, manufacturing the components separately has been found to increase the yield of each component during the manufacturing process since the less complex components described herein may be manufactured more reliably to the required standard of uniformity and precision. This may, in turn, increase both the yield of flow meters produced using the pre-formed inserts and may also increase the accuracy of the flow meters. Hence pre-formed reinforced inserts may be supplied and fitted into a variety of spool pieces or flow conduits to allow flow meters to be produced reliably and efficiently.

Preferably, arranging the reinforcing component around the insert comprises deforming the insert to insert a portion through the reinforcing component.

According to one embodiment, at least a portion of the exterior surface of the measuring section of the insert is surrounded by the reinforcing component. Hence the reinforcing component may reduce or substantially eliminate deformation of the measuring section of the insert under pressure, for example under internal fluid pressure from the fluid flowing through the conduit. This may allow the measuring section of the assembly to be substantially inelastic so that the cross-sectional area of the measuring section remains substantially constant within the limits of measurement accuracy with variations in fluid pressure, velocity and temperature expected in use.

According to one embodiment, the reinforcing component comprises a rigid ring or sleeve. For example, the reinforcing component may be a substantially tubular component. The cross-section of the reinforcing component is preferably the same shape as and has similar dimensions to the measuring section of the undeformed insert.

Preferably, the reinforcing component comprises at least one band of metallic, non-ferromagnetic material. For example, the component may be manufactured substantially from stainless steel.

The reinforcing component may further advantageously form an electrostatic screen for the measuring section of the insert.

A bonding agent is preferably used to bond the reinforcing component, for example a stainless steel tube to the insert, for example a rubber component. The assembly may then be cured in an oven to secure the bond between the reinforcing component and the insert.

A plurality of reinforcing components may be provided and the components may be self-contained or may co-operate with other components surrounding the insert.

Using a reinforcing component such as a stainless steel tube provides further advantages over simply using a deformable or a resiliently deformable insert and supporting the insert by back-potting. For example, if a flexible insert was inserted into a flow conduit and back potted with a plastic material, at high temperatures the bore area may change giving a calibration shift and if the potting material did not bond to the insert then the design may be pressure sensitive. A reinforcing component, such as a stainless steel tube, reduces the thermal expansion impact and may ensure that the design is not pressure sensitive (either positive or negative pressures). Using a reinforcing component such as a stainless tube may also allow the use of prior art electrode sealing techniques.

Preferably, the insert comprises an inlet section, an outlet section and a measuring section therebetween.

According to one embodiment, the diameter of the measuring section of the insert is smaller than the diameter of the inlet and outlet sections. The reduced bore of the measuring section may provide an increased flow rate of fluid through the measuring section, which can improve the sensing accuracy of the meter.

The assembly may be arranged so that the diameter of the inlet and/or outlet section of the assembly corresponds substantially to the respective diameter of the flow conduit at the inlet and/or outlet. This may allow the fluid to flow smoothly into and/or out of the assembly within the flow conduit. This may minimise the disturbance of the flow of the fluid through the assembly and may allow more accurate flow measurement readings to be determined.

Preferably, the insert further comprises at least one tapered section wherein the diameter of the insert changes in a smooth transition between the measuring section and the inlet and/or outlet sections. This may further promote the smooth flow of fluid through the assembly.

In one embodiment, the insert may be formed substantially from a resiliently deformable material. This may allow the insert to be deformed, for example to arrange the insert within the reinforcing component and/or to arrange the insert within a flow conduit, but the insert may advantageously generally regain its shape after insertion.

In one embodiment, the insert may be formed substantially from an elastomeric material or a composite material. For example, the insert may be formed from natural or synthetic rubber or may be formed from a plastics material such as ABS (Acrylonitrile Butadiene Styrene). The insert may be formed by any suitable manufacturing technique, for example by compression, injection or transfer moulding. Preferably, the insert is formed from a homogeneous material.

In an alternative embodiment, the insert is formed substantially from a thermoset or a thermoplastics material.

In a further embodiment, the insert may be formed substantially from PTFE.

In a one advantageous embodiment, the method further comprises providing magnetic field generating means, for example magnetic coils of any form used or usable in electromagnetic flow meters. The magnetic field generating means may be attached to the exterior surface of the assembly or may be incorporated in the assembly. Magnetic field generating means may be further supported if the assembly is back-potted after insertion into the flow conduit.

Preferably, the method further comprises providing electrodes, preferably at least two electrodes. The electrodes may be arranged to sense the potential developed across a fluid flowing through the insert and may include an earthing electrode which may be coupled to the pipeline.

In one embodiment, the reinforcing component may include means for locating and securing at least one of magnetic field generating means, electrodes and wiring.

The method may further comprise providing means for measuring the conductivity of the fluid.

Preferably, the method further comprises the step of forming a flow meter by inserting the assembly into a section of a flow conduit. Preferably, inserting the assembly comprises deforming at least a portion of the insert. Providing magnetic field generating means and/or electrodes coupled to the assembly may simplify the manufacturing process for the electromagnetic flow meter, since a preformed assembly may be manufactured and calibration steps may be performed. The flow meter itself may then be formed in a straightforward process by inserting the assembly into the flow conduit and securing the assembly into position.

According to one embodiment, the method further comprises the step of back-potting the assembly into the flow conduit. Back-potting the assembly may provide further support for the assembly, which may include magnetic field generating means and electrodes, and may secure the assembly into position within the flow conduit. Back-potting may provide a hermetically sealed unit.

According to one embodiment, the method further comprises providing as part of the assembly, preferably as part of the insert, at least one flange for securing the assembly to a section of flow conduit. The flange may be formed integrally with the insert, for example by means of extensions of resilient material intended to be trapped between sections of the flow conduit into which the assembly is inserted. The flange may be secured between sections when connections between the sections are tightened to make the flow conduit fluid-tight instead, or in addition, the anchoring may be achieved by means of connections or couplings to the wall of the flow conduit, advantageously in the vicinity of the electrical connections to the sensing electrodes or the electromagnetic coils of the sensor. These may be used to secure the insert to a section of the flow conduit at a point intermediate the ends of the section of flow conduit.

In one embodiment, the method may further comprise providing sealing means for sealing the assembly to a section of flow conduit to inhibit leakage from the bore defined by the insert. This may be particularly advantageous if an end of the insert is not dimensioned to be trapped between sections of pipeline to form a seal. This may allow the insert to provide a fluid-tight cavity within the pipeline, which may prevent fluid reaching the coils or other sensing elements or by-passing the metering bore.

In one embodiment, the method may further comprise monitoring deformation of the measuring section of the insert or monitoring pressure on the insert, for example by monitoring the fluid pressure within the insert.

Preferably, the method further comprises compensating a sensor output based on the determined deformation or pressure. Hence the effects of deformation may be incorporated into the output of a flow meter. Calibration readings may be taken in a test environment and the results may be incorporated into an electronic "look-up table" against which readings derived during normal usage of the sensor can be automatically compensated, provided that sufficient operational parameters can be detected.

A further aspect provides a method of manufacturing an electromagnetic flow meter comprising inserting an electromagnetic flow meter assembly manufactured in a method according to the first aspect or any of its preferred features into a section of a fluid flow conduit and securing the assembly into the section of the fluid flow conduit.

According to one embodiment, the inserting step comprises deforming at least a portion of the insert. This may allow an assembly that is a close fit to the dimensions of the flow conduit to be inserted into the section.

Preferably, the method further comprises back-potting the assembly to secure it within the fluid flow conduit. This may further support and secure the assembly against movement or deformation within the flow conduit.

According to one embodiment, the securing step comprises securing the assembly into the section of the fluid flow conduit by means of flanges attached to the assembly. Hence the assembly may be fixed securely within the flow conduit and the flanges may further be arranged to form a water-tight seal to prevent leakage of fluid around or behind the assembly.

According a further aspect, there is provided an electromagnetic flow meter assembly comprising an insert for insertion into a flow conduit, wherein at least a portion of the insert is formed of a deformable non-ferromagnetic material wherein the insert comprises an inlet section, a measuring section and an outlet section. The assembly further comprises at least one reinforcing component surrounding the measuring section of the insert to reinforce the insert against deformation under the application of pressure.

Preferably, the reinforcing component is bonded to the insert. The assembly may be cured, for example in an oven, to secure the bond between the reinforcing component and the insert.

Preferably, the reinforcing component surrounds at least a portion of the exterior surface of the measuring section of the insert. Hence deformation of the measuring section may be reduced or substantially eliminated and hence may be rendered substantially inelastic.

According to one embodiment, the reinforcing component comprises a rigid ring or sleeve, for example, the reinforcing component may comprise a substantially tubular component.

Preferably, the reinforcing component comprises at least one band of metallic, non-ferromagnetic material.

According to one embodiment, the diameter of the measuring section of the insert is smaller than the diameter of the inlet and outlet sections. Preferably, the diameter of the inlet and/or outlet section of the assembly corresponds substantially to the respective diameter of the flow conduit at the inlet and/or outlet.

In one embodiment, the insert is formed substantially from a resiliently deformable material, such as rubber.

Preferably, the insert is formed substantially from an elastomeric or a composite material.

In an alternative embodiment, the insert is formed substantially from a thermoset or a thermoplastics material.

In a further embodiment, the insert is formed substantially from PTFE.

In one embodiment, the assembly further comprises magnetic field generating means. Preferably, the assembly further comprises electrodes. Providing magnetic field generating means and electrodes may allow a flow meter to be formed easily and quickly by inserting the completed assembly into a flow conduit.

A further aspect provides an electromagnetic flow meter comprising a section of a fluid flow conduit having inserted therein an electromagnetic flow meter assembly according to the previous aspect or any of its preferred features.

Preferably, the assembly, preferably the insert, comprises at least one flange for securing the assembly to a section of flow conduit.

Preferred features of one aspect may be applied to other aspects and variations of detail, obvious to one skilled in the art, may provided and fall within the scope of the invention as defined by the claims.

BRIEF DESCRIPTION OF THE DRAWINGS

Embodiments of the invention will now be described in more detail by way of example only with reference to the figures in which.

DETAILED DESCRIPTION OF CERTAIN INVENTIVE EMBODIMENTS

Figure 1:
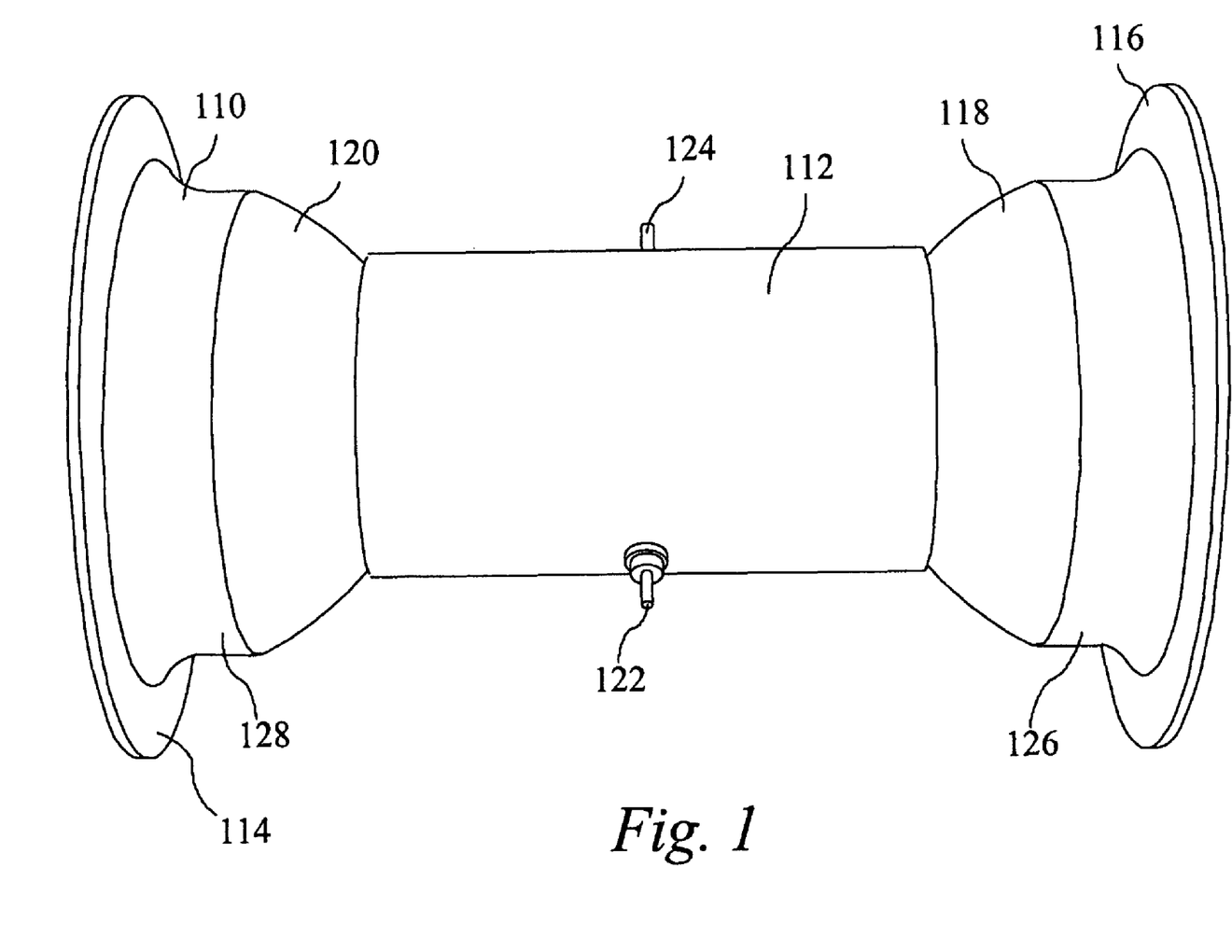
FIG. 1 is an illustration of one embodiment of a flow meter assembly.

The assembly of FIG. 1 includes an insert 110 manufactured from a deformable material, for example natural or synthetic rubber, and a rigid reinforcing component 112, in this embodiment, in the form of a metallic sleeve. The insert 110 has an inlet section 128 and an outlet section 126 of substantially the same cross-sectional diameter and shape as the flow conduit into which the assembly is to be inserted. The inlet 128 and outlet 126 sections of the present embodiment include flanges 114, 116 by which the assembly may be secured to the flow conduit, for example using fastening means such as bolts or by trapping the flange between sections of the flow conduit.

The inlet 128 and outlet 126 sections of the insert 110 are connected to the measuring section of the insert (within the reinforcing component 112) by tapered sections 118, 120, which may provide a smooth transition for the fluid into the measuring section, which has a smaller cross-sectional diameter than the flow conduit.

The measuring sections of the insert of the present embodiment is covered by a reinforcing component 112 in the form of a generally tubular metallic component. Any material that is resistant to deformation under the application of pressure (preferably both negative and positive pressure) may be used for the reinforcing component 112.

The assembly of the present embodiment is further provided with means to allow electrodes to be applied to the fluid 122, 124 and may further be provided with magnetic field generating means, for example electromagnetic coils, external or internal to the reinforcing means.

Figure 2:
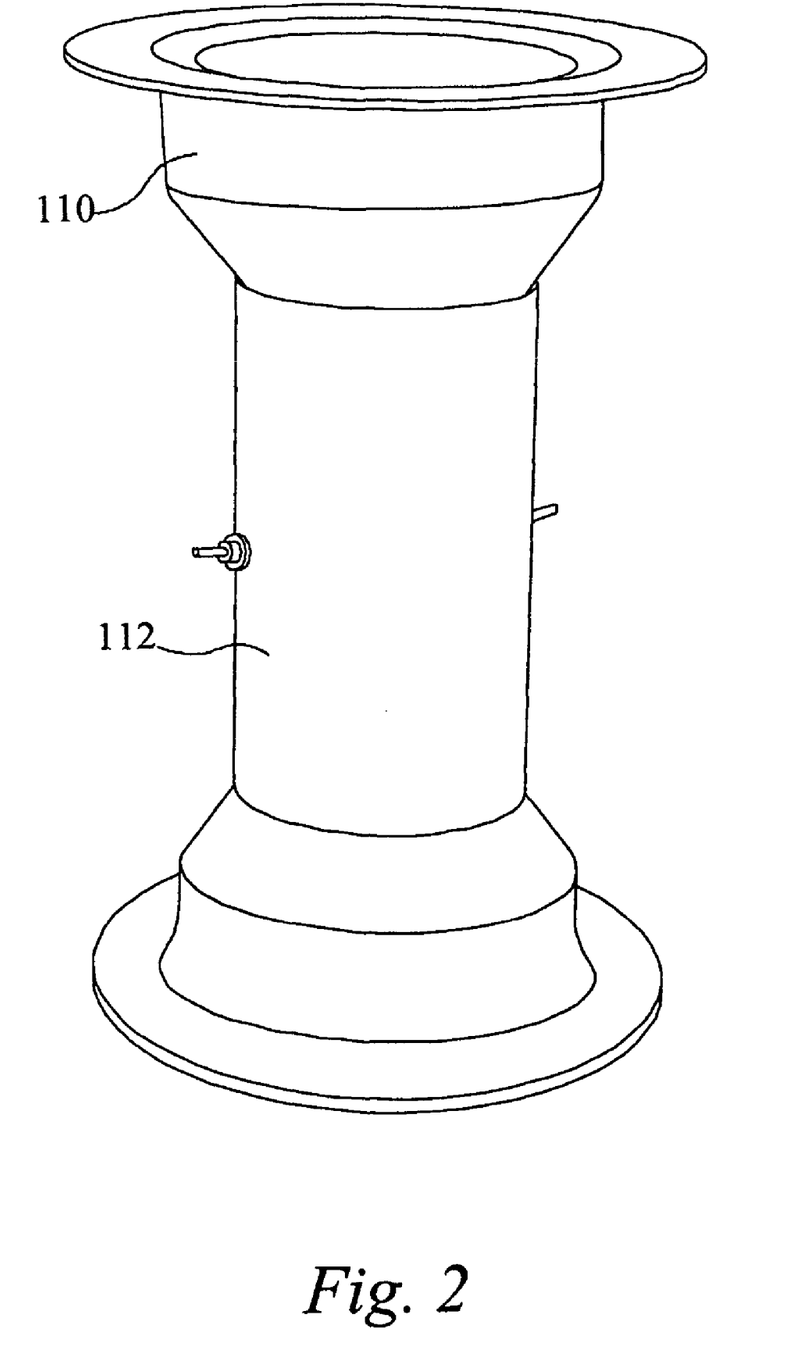
FIG. 2 is a further illustration of the flow meter assembly of FIG. 1.
Figure 3:
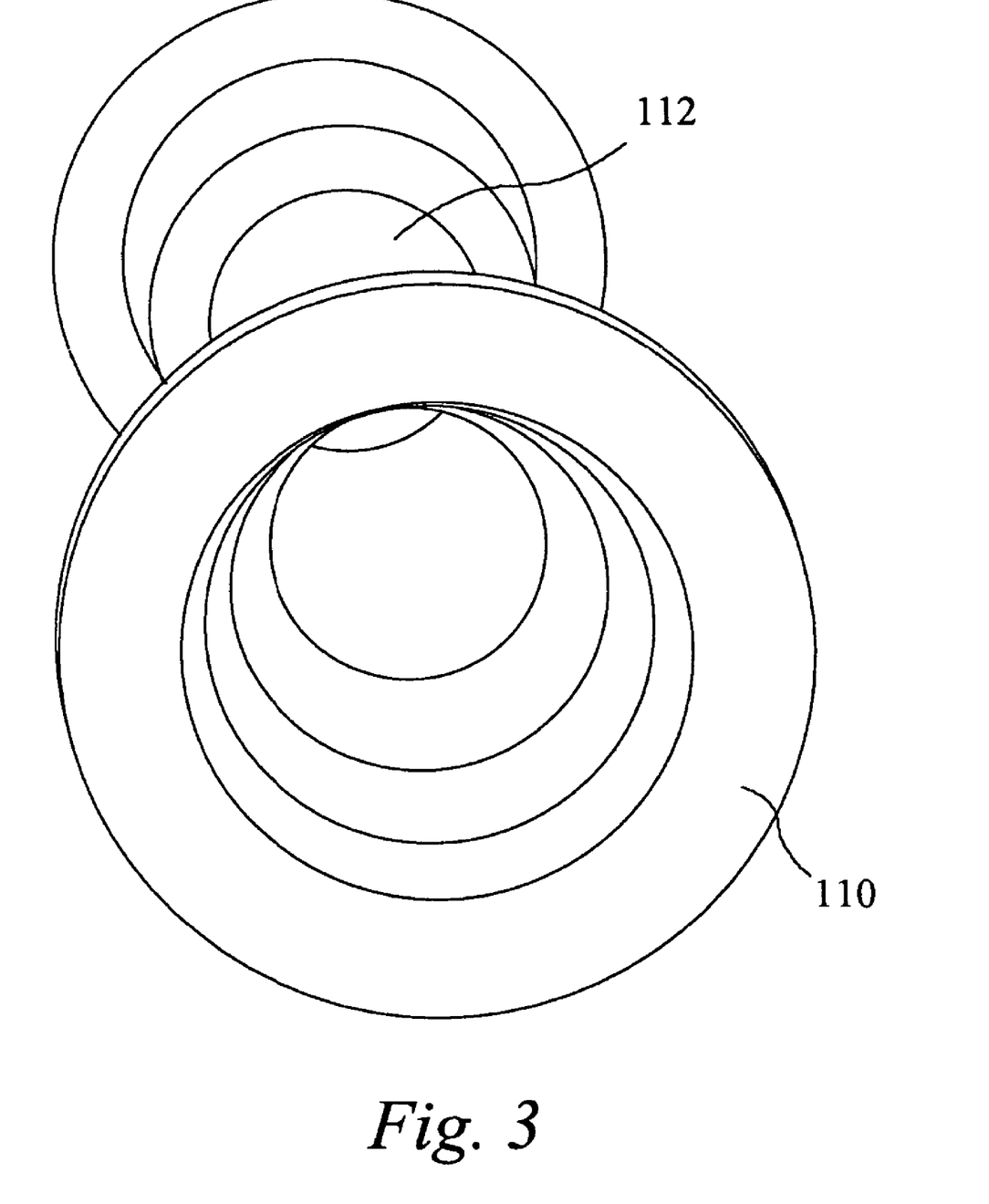
FIG. 3 is a further illustration of the flow meter assembly of FIGS. 1 and 2.

FIGS. 2 and 3 are further illustrations of the assembly of FIG. 1 showing the insert 110 and the reinforcing component 112. FIG. 3 provides an end-view of the assembly, which illustrates that both the insert 110 and the reinforcing component 112 are hollow components and so provide an internal flow conduit for the fluid to be measured.

Figure 4:
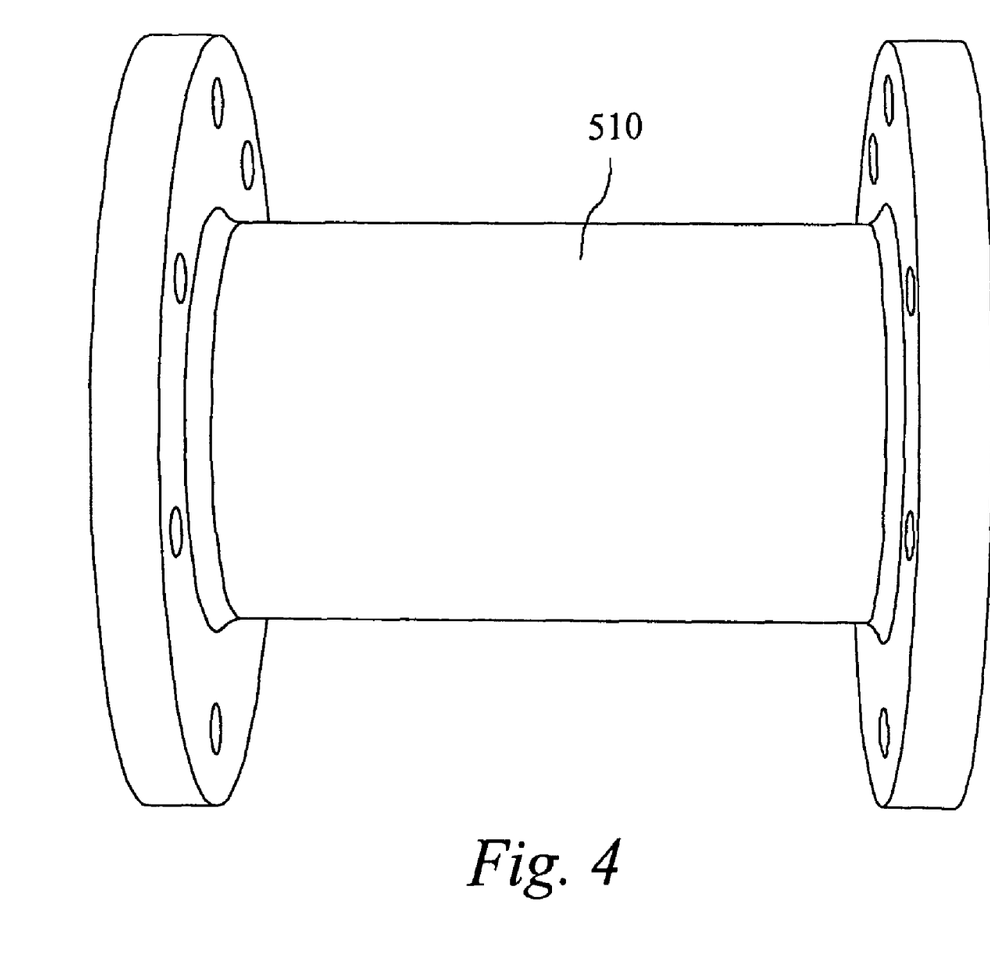
FIG. 4 is an illustration of one embodiment a spool piece into which a flow meter assembly may be inserted.

FIG. 4 illustrates one embodiment of a spool piece 510 into which the assembly may be inserted. The spool piece 510 of the present embodiment comprises a length of tubular material, for example stainless steel. The spool piece may be of similar strength to that of the fluid flow conduit and the spool piece 510 may be inserted as a series element into the conduit or pipeline, which may be manufactured, for example, from carbon steel.

Figure 5:
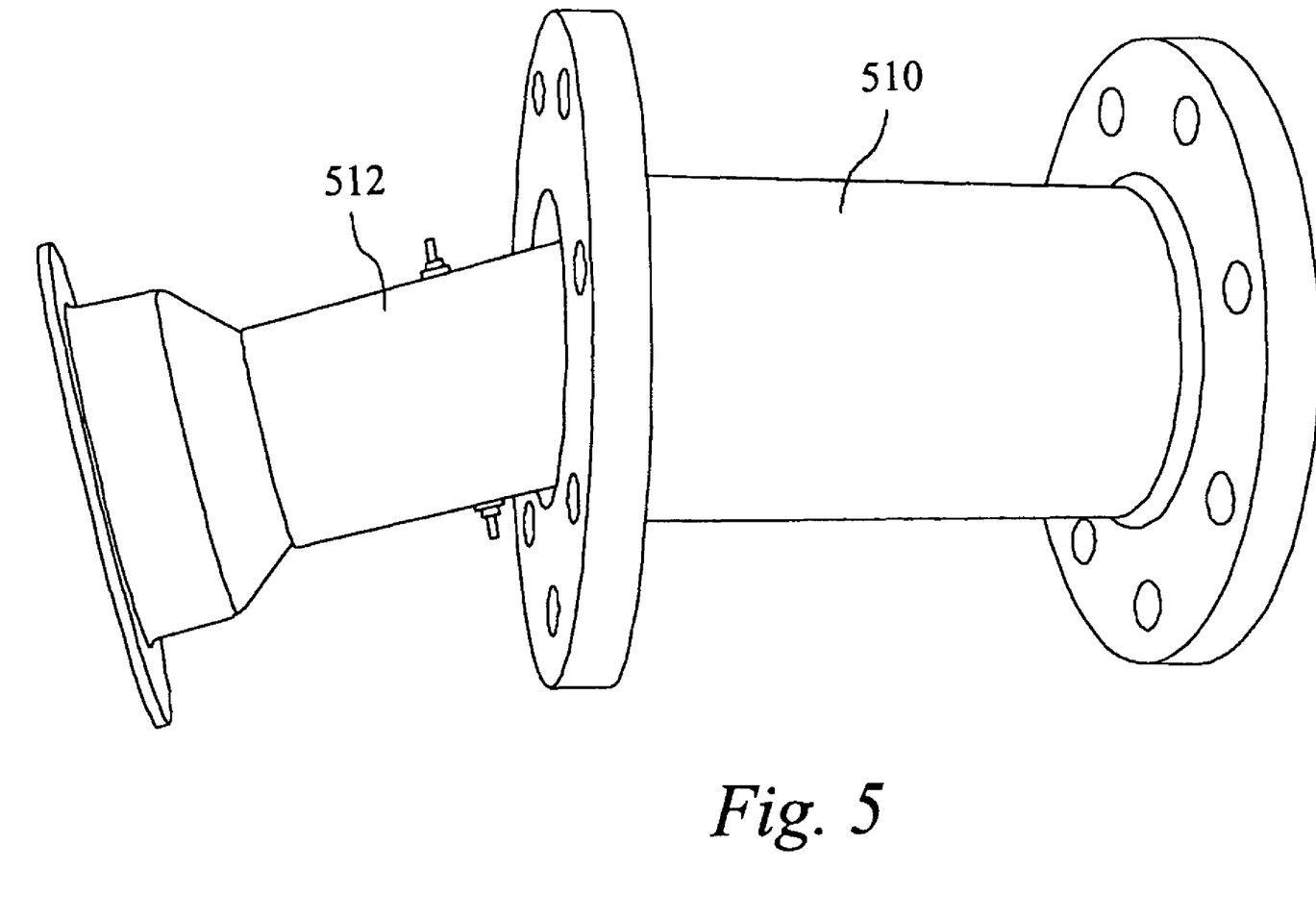
FIG. 5 is an illustration of a flow meter assembly being inserted into a spool piece according to one embodiment.

FIG. 5 illustrates the insertion of the assembly 512 of FIGS. 1 to 3 into the spool piece 510 of FIG. 4. Since the inlet 128 and outlet 126 sections and flanges 114, 116 of the insert of the present embodiment are manufactured from a deformable material, the insert deforms to fit within the spool piece 510. In alternative embodiments, sections of the insert may not be deformable and, for example, one or both flanges may be attached to the assembly 512 after it has been inserted into the spool piece 510.

Figure 6:
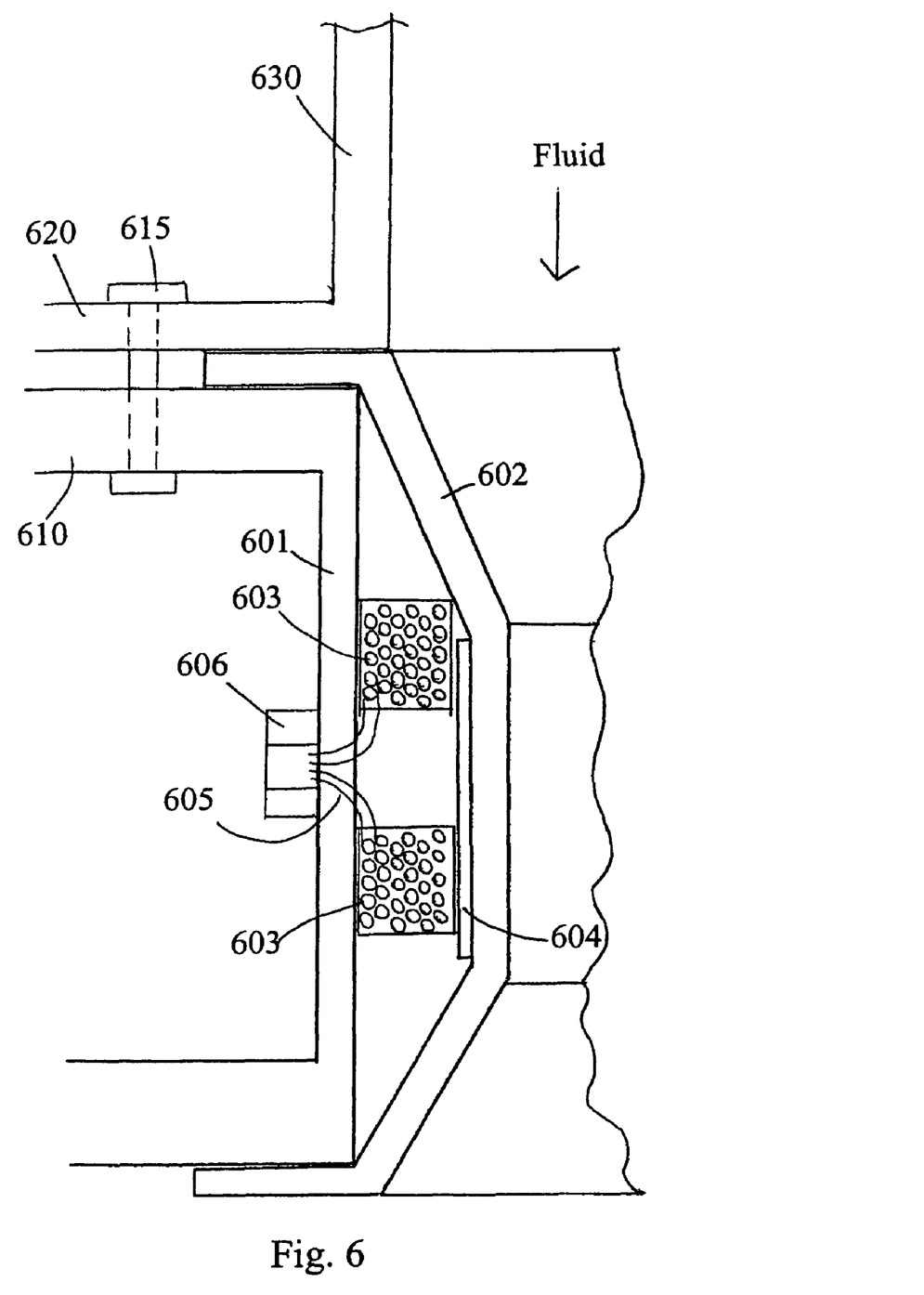
FIG. 6 is a schematic diagram of an embodiment of an insert positioned within a section of the fluid conduit or within a spool piece.

FIG. 6 illustrates a cross-sectional view of one embodiment of an assembly inserted into a spool piece. The spool 601 contains a resilient tubular insert 602 of an electrically insulating, non-conductive material, which in this example is an elastomer or synthetic rubber. Other materials can be used and, in particular, the material need not be homogeneous.

The insert 602 may support electromagnetic coils 603, or such coils may be supported in a potting material if the insert 602 is back-potted in the spool piece 601. The electromagnetic coils may be of any convenient form as used or useable in electromagnetic flow meters and can be entirely conventional. The insert 602 may also have associated electrode means, normally at least two electrodes, (not shown) for sensing the potential developed across a fluid flowing through the insert, and may contain an earthing electrode for coupling to the pipeline. The insert may also include means for measuring the conductivity of the fluid.

Surrounding the surface of the insert 602 is a band 604 of reinforcing material, for example metal such as stainless steel, or another rigid material, for example a filamentary material such as glass fibre, Nylon™ or Rayon™. The reinforcing material may be used to resist deformation of the insert in response to fluid pressures that may be encountered in operation. In alternative embodiments, the reinforcing material 604 may be integrated with the magnetic return circuit for the coils 603. In general, multiple bands of similar or differing constructions can be used. Electrical cables generally shown at 605 communicate between the coils 603, the sensing electrodes and a connector block 606, which may be mounted externally of the spool 601, which may also contain electrical circuitry including data storage and/or remotely addressable or signalling components.

In this example of the invention, the insert 602 is located within the spool 601 by means of extensions of the resilient material of insert 602 which protrude from the spool 601 and are intended to be trapped between the spool and the abutting ends of the pipeline 630 to which the spool is to be fitted as a series element. Location is completed by the action of securing the spool by means of bolts 615 securing the flange 610 of the spool to a flange 620 of the adjacent portion of pipeline 630, the trapped ends of the insert serving as a sealing gasket, and also providing some anchorage for the insert. A tubular member (not shown) may be provided to surround and protect the cables and, if so provided, may be used to effect secure anchoring of the insert 602 to the spool 601.

As mentioned above, the spool need not be secured by means of flanges. Where a flangeless coupling is intended, for example following the principles described in our UK Patent Application No. 9613172.7, the insert is preferably secured by means of adhesive at some distance from the end of the spool, and a protective shroud is preferably provided to shield the lining of the insert.

As can be seen in FIG. 6, in the present embodiment, the surface of the insert 602 that will be exposed to the fluid flowing in the pipeline, and thus through the insert, is shaped to present a desired profile to the fluid whose flow is to be measured. In this example, the insert is shaped to form a throat of reduced diameter which exhibits advantage in that the flow velocity is increased locally to the coils, permitting measurements of increased accuracy to be made. The shaping of the insert need not be the same on the upstream and downstream sides of the spool.

In the above embodiment, the insert is made of material which can be deformed to allow insertion into the spool. In an alternative embodiment, the insert may be made from a material which is not substantially deformable, in which case at least one end may have an overall diameter less than that of the bore of the spool, to enable the insert to be inserted from one end of the spool. In such a case, sealing may be effected by one or more additional components, such as sealing rings.

It is possible to utilise calibration and electrical monitoring of flow parameters to detect and compensate for distortion of the insert 602, and such procedures can be used instead of, or in addition to, the provision of reinforcing bands such as 604. As mentioned previously, electronic lookup tables can be used in a conventional manner for these purposes.

A meter constructed as described above may have a reduced diameter measuring section, compared to the diameter of the pipeline. This may allow greater measurement accuracy to be achieved. The insert, together with its sensing means and magnetic field generating equipment, if fitted, is a self-contained sub-assembly which is independent of the specific flange arrangement to be mated to. This construction allows greater flexibility within the process of manufacturing meters, which is of commercial benefit.

In a further embodiment, the insert may be manufactured from PTFE (Polytetrafluoroethylene). A flow meter insert according to this further embodiment is illustrated in FIG. 7.

In this embodiment, it may be particularly advantageous to form the reinforcing component 710 as a sleeve that surrounds the insert 712. Preferably, coils 714 and electrodes 716 may be provided outside the reinforcing component 710.

Forming the reinforcing component 710 around the insert 712 may advantageously allow the reinforcing component to be used as a vapour diffusion barrier between the flow conduit and the components of the electromagnetic flow meter. In particular, if the fluid is flowing through the flow conduit at a high temperature or pressure, vapour may pass through an unprotected PTFE insert and may damage the components of the flow meter, in particular the flow meter coil, which may lead to premature failure of the coil. Forming the reinforcing component, which is preferably made from steel, as a sleeve around at least the section of the insert that is adjacent to the flow meter components, may therefore be advantageous in protecting the components and prolonging the operational lifetime of the flow meter. Preferably, the reinforcing component extends the whole length of the spool piece. In addition, using a reinforcing sleeve around a PTFE insert may allow the shape of the flow conduit to be maintained when the insert is assembled into a spool piece of the flow conduit. FIG. 8 illustrates one embodiment of a spool piece 810 into which the insert may be placed. After insertion of the flow meter insert, the spool piece may be assembled in series with other components of the flow conduit to form part of the fluid flow path.

Figure 7:
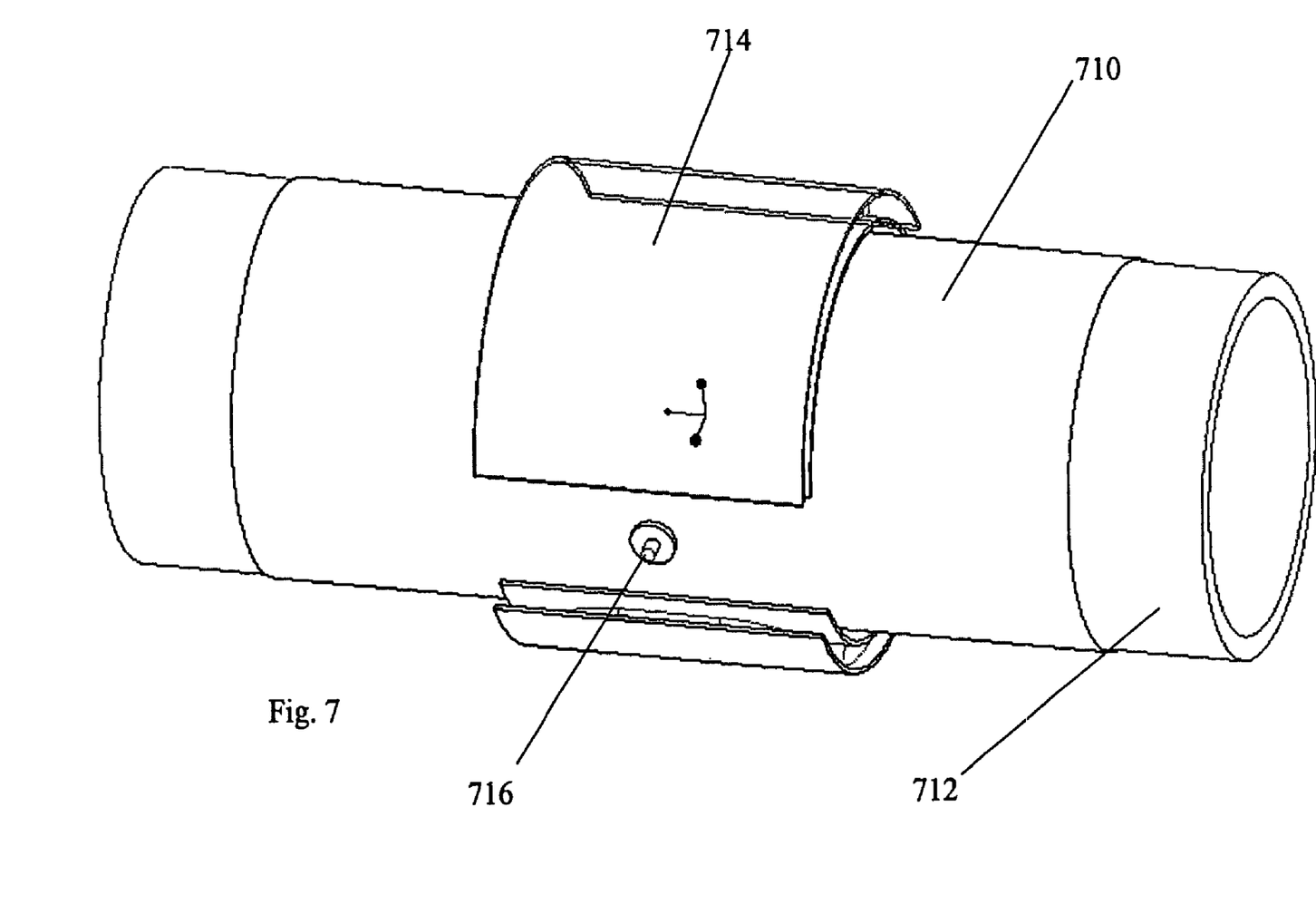
FIG. 7 illustrates a further embodiment of a flow meter assembly wherein the flow meter is manufactured from PTFE.
Figure 8:
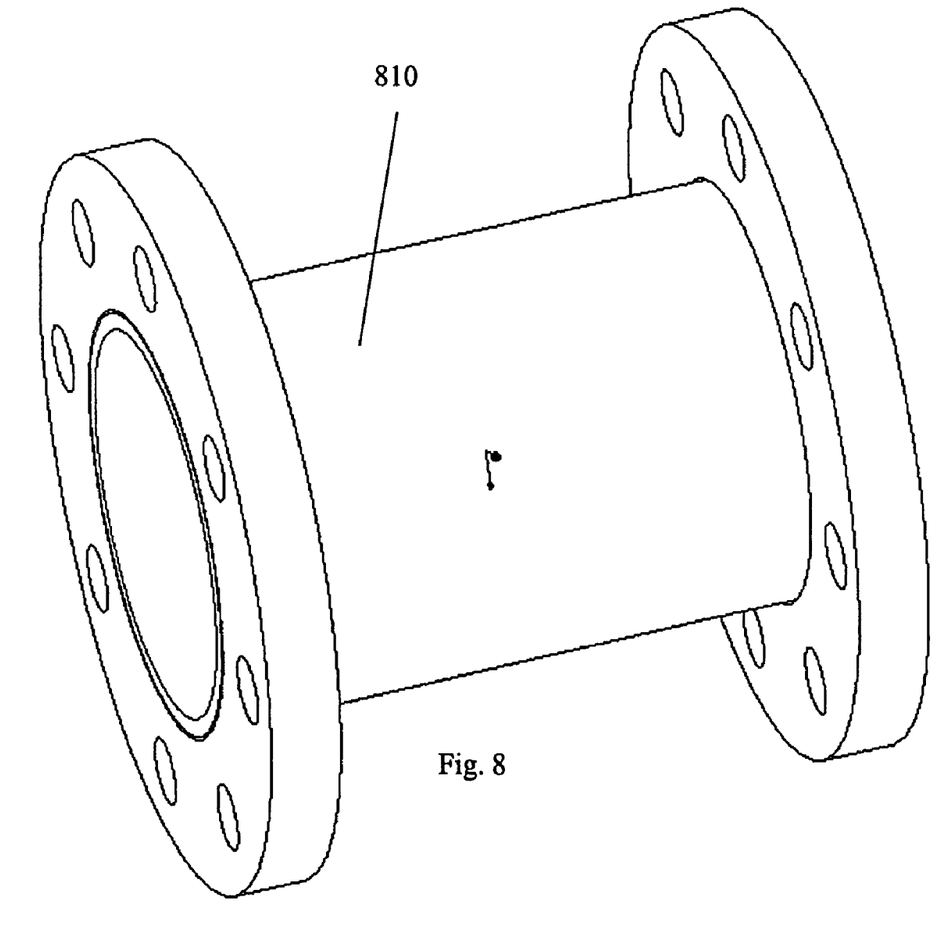
FIG. 8 is a further illustration of an embodiment of a spool piece into which a flow meter assembly may be inserted.
Figure 9:
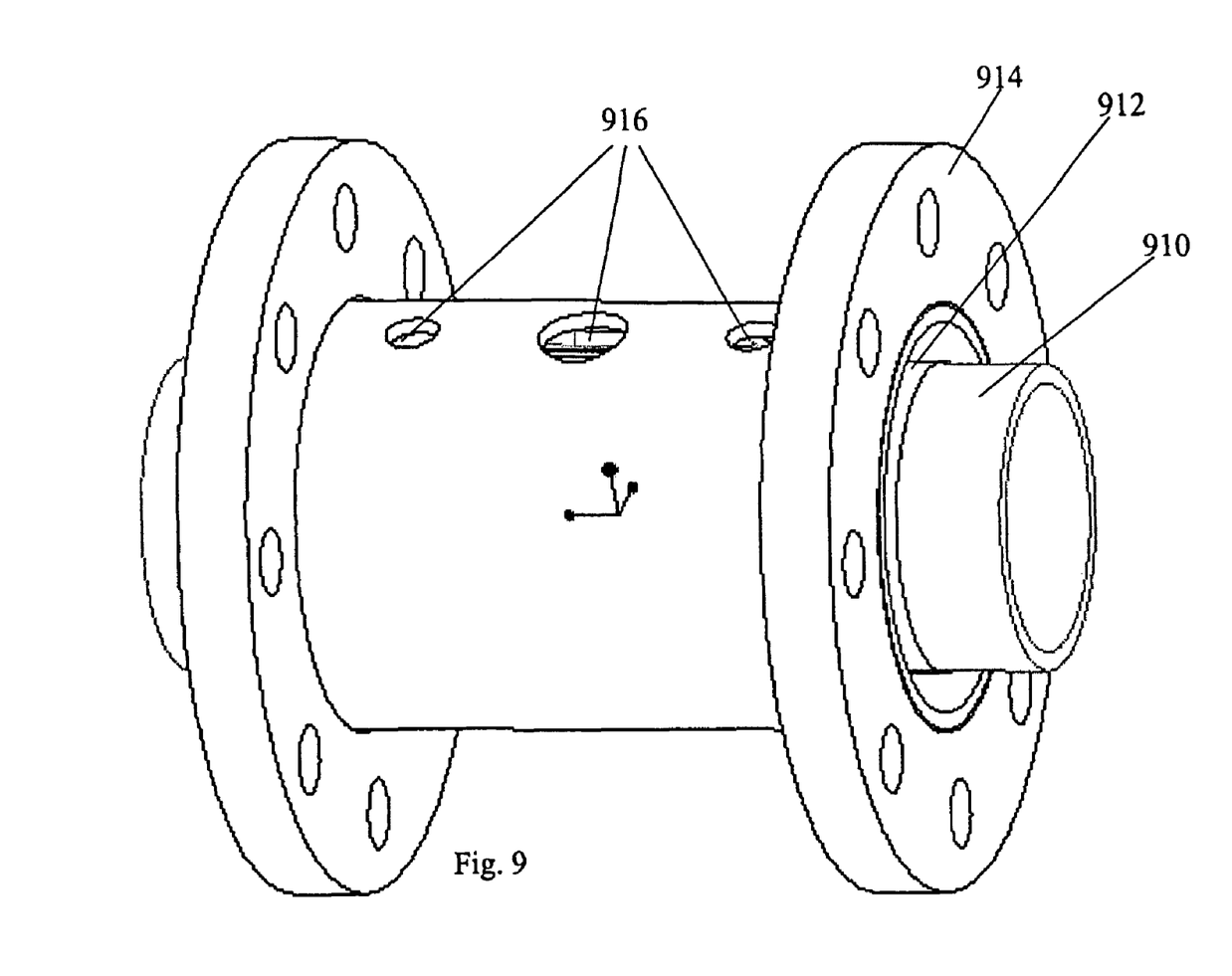
FIG. 9 illustrates a step in the process of positioning the assembly within the spool piece.

In this embodiment, the insert 712 may be formed without flanges, for example as a generally tubular structure, as shown in FIG. 7. Further, the insert of the present embodiment is formed without a restriction in the bore of the insert. The tubular form of the insert may allow the reinforcing component to be placed over the insert and the insert to be positioned within a spool piece of the flow conduit without deformation of the insert. FIG. 9 illustrates the process of inserting a generally tubular insert 910 and reinforcing component 912 into the spool piece 914. FIG. 9 also illustrates the holes in the spool piece 914 that may be provided to allow connection of the electrodes and the magnetic coils.

Figures 10A, 10B:
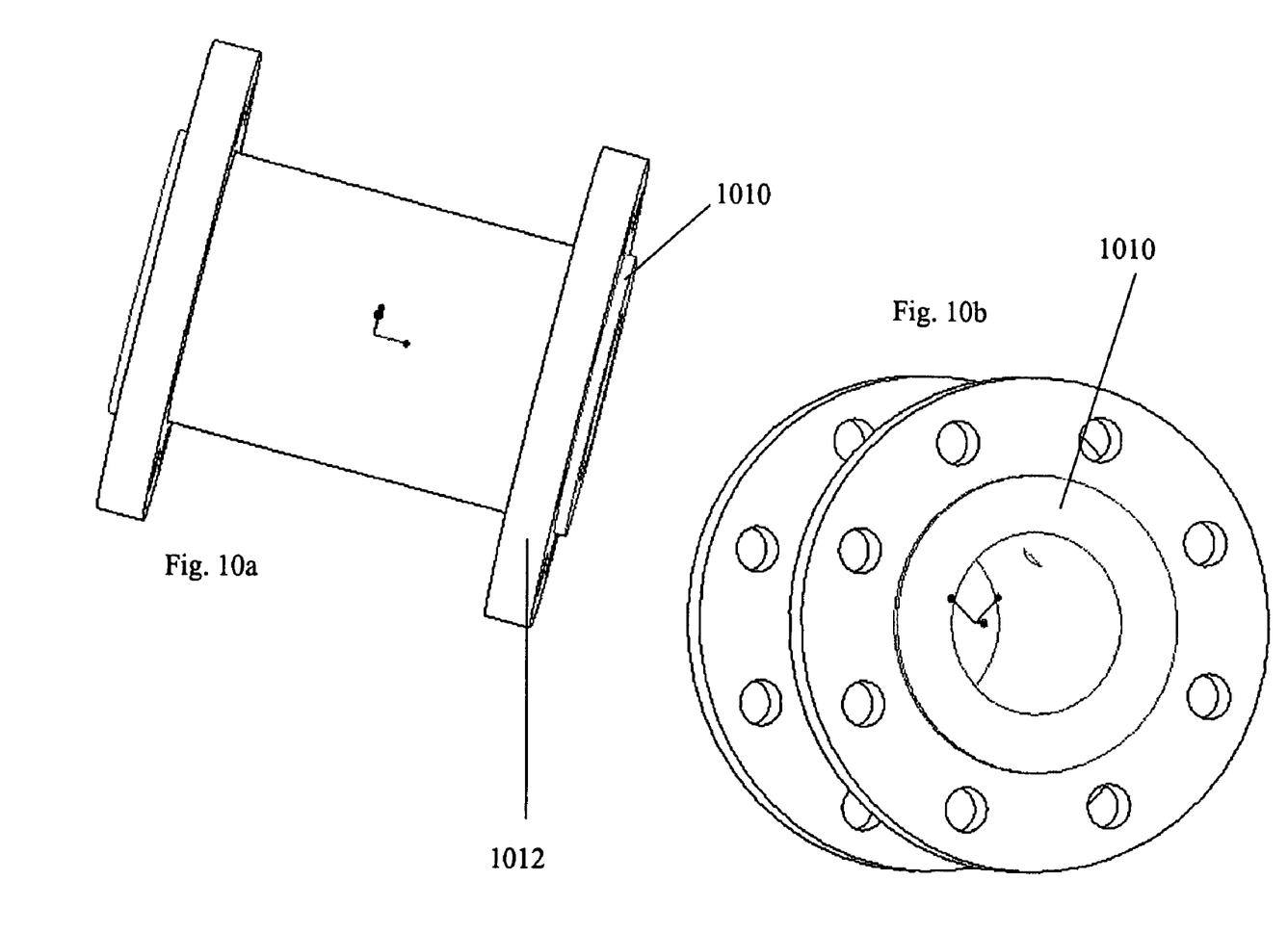
FIGS. 10a and 10b illustrate a flow meter assembly positioned and secured within a spool piece.

As shown in FIGS. 10*a* and 10*b*, once the insert has been inserted, pressure may then be applied to the ends of the insert 1010 to deform the ends of the insert and bend them outwards to secure the insert within the spool piece. The ends of the insert may further be trapped between the spool piece 1012 and the adjacent components of the flow conduit and hence may be held securely in place.

As can be seen in FIG. 9, the inner diameter of the spool piece is preferably greater than the maximum diameter of the flow meter assembly to allow the flow meter components, such as the magnetic coils and the electrodes, to be positioned within the spool piece. After the assembly has been positioned within the spool piece, it is preferably back-potted to secure the assembly and the flow meter components in place and to strengthen the flow meter.

It will be clear to one skilled in the art that modifications of detail may be provided and features of embodiments described may be applied to other embodiments within the scope of the invention as defined by the following claims.

The invention claimed is:

1. A method of manufacturing an electromagnetic flow meter insert assembly for insertion within and along a flow conduit, the method comprising:
   providing a molded insert formed from a deformable material, the molded insert comprising, in an un-deformed state:

an inlet for receiving fluid flowing along the flow conduit, the inlet defining an inlet bore in which the received fluid can flow, an outlet for outputting fluid that flows through the insert, the outlet defining an outlet bore in which the output fluid can flow, and a measuring section between the inlet and the outlet, the measuring section defining a measuring section bore, wherein the cross-sectional area perpendicular to the flow direction of the measuring section bore is smaller than the cross-sectional areas perpendicular to the flow direction of the inlet bore and the outlet bore, wherein the difference between the cross-sectional areas of the measuring section bore and the inlet and outlet bores defines a space for placing an electromagnetic coil between the measuring section and the flow conduit;

providing at least one reinforcing component;

arranging the reinforcing component around the measuring section but not around the inlet or the outlet; and bonding the reinforcing component to the exterior surface of the measuring section to reinforce the measuring section against deformation under the application of pressure, wherein the bonding occurs prior to the insert being placed within and along the flow conduit.

2. The method according to claim 1, wherein arranging the reinforcing component around the measuring section comprises deforming the insert to insert a portion thereof through the reinforcing component.

3. The method according to claim 1, wherein a bonding agent is used to bond the reinforcing component to the insert.

4. The method according to claim 1, wherein the assembly is cured to secure the bond between the reinforcing component and the insert.

5. The method according to claim 1, further comprising forming a plurality of reinforcing components.

6. The method according to claim 1, wherein the insert further comprises at least one tapered section, and wherein the diameter of the insert changes in a smooth transition between the measuring section and at least one of the inlet section and the outlet.

7. The method according to claim 1, wherein the insert comprises at least one of: a resiliently deformable material, rubber, an elastomeric material, a composite material, a thermoset, a thermoplastics material, and PTFE.

8. The method according to claim 1, further comprising providing at least one of a means for generating a magnetic field and one or more electrodes.

9. The method according to claim 1, wherein the reinforcing component includes means for locating and securing at least one of a means for generating a magnetic field, electrodes, and wiring.

10. The method according to claim 1, wherein the method further comprises forming a flow meter by inserting the insert assembly within and along a section of the flow conduit.

11. The method according to claim 10, wherein inserting the insert assembly comprises deforming at least a portion of the insert.

12. The method according to claim 10, further comprising back-potting the insert assembly into the flow conduit.

13. The method according to claim 10, wherein the insert assembly is inserted into the section of the flow conduit without deforming the insert assembly.

14. The method according to claim 10, further comprising deforming the insert after insertion of the insert assembly into the flow conduit to secure the insert assembly within the flow conduit.

15. The method according to claim 14, wherein deforming the insert comprises forming at least one flange with the deformed insert at one end of the insert assembly.

16. The method according to claim 1, further comprising providing at least one flange for securing the insert assembly to a section of the flow conduit.

17. The method according to claim 1, further comprising providing a seal configured to seal the insert assembly to a section of flow conduit to inhibit leakage from the insert.

18. The method according to claim 1, further comprising monitoring at least one of deformation of the measuring section of the insert and pressure on the insert.

19. The method according to claim 18, further comprising compensating a sensor output based on the determined deformation or pressure.

20. The method according to claim 1, further comprising forming a magnetic field generator around the reinforcing component.

21. The method according to claim 1, wherein the reinforcing component is a flangeless and rigid sleeve that has a cross-sectional area perpendicular to the flow direction which is larger than the cross-sectional area of the measuring section and smaller than the cross-sectional areas of the inlet and outlet bores.

22. A method of manufacturing an electromagnetic flow meter, comprising:

providing a molded insert formed from a deformable material, the molded insert comprising, in an un-deformed state:

an inlet for receiving fluid flowing along a flow conduit, the inlet defining an inlet bore in which the received fluid can flow, an outlet for outputting fluid that flows through the insert, the outlet defining an outlet bore in which the output fluid can flow, and a measuring section between the inlet and the outlet, the measuring section defining a measuring section bore, wherein the cross-sectional area perpendicular to the flow direction of the measuring section bore is smaller than the cross-sectional areas perpendicular to the flow direction of the inlet bore and the outlet bore, wherein the difference between the cross-sectional areas of the measuring section bore and the inlet and outlet bores defines a space for placing an electromagnetic coil between the measuring section and the flow conduit;

providing at least one reinforcing component;

arranging the reinforcing component around the measuring section but not around the inlet or the outlet;

bonding the reinforcing component to the measuring section to reinforce the measuring section against deformation under the application of pressure, thereby forming an electromagnetic flow meter insert assembly;

inserting the electromagnetic flow meter assembly within and along a section of a fluid flow conduit; and securing the assembly to the section of the fluid flow conduit.

23. The method according to claim 22, wherein inserting comprises deforming at least a portion of the insert.

24. The method according to claim 22, wherein securing the assembly comprises securing the insert assembly into the section of the fluid flow conduit using flanges attached to the insert assembly.

25. The method according to claim 22, wherein the insert assembly is inserted into a section of a flow conduit without deforming the insert assembly.

26. The method according to claim 25, further comprising deforming the insert after insertion of the insert assembly into the flow conduit to secure the insert assembly within the flow conduit.

27. The method according to claim 26, wherein deforming the insert comprises forming at least one flange with the deformed insert at one end of the assembly.

28. The method according to claim 22, further comprising back-potting the assembly to secure it within the fluid flow conduit.

29. The method according to claim 22, further comprising forming a magnetic field generator around the reinforcing component.

30. The method according to claim 22, wherein the reinforcing component is a flangeless and rigid sleeve that has a cross-sectional area perpendicular to the flow direction which is larger than the cross-sectional area of the measuring section and smaller than the cross-sectional areas of the inlet and outlet bores.

* * * * *